July 12, 1932.   H. W. SPOONER   1,866,944
METHOD AND APPARATUS FOR PRINTING SECURITY QUOTATIONS
Filed Nov. 23, 1926   3 Sheets-Sheet 1
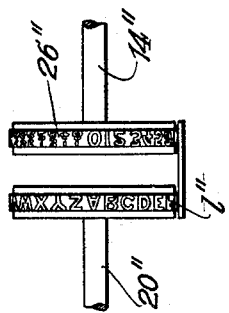
Inventor
HENRY W. SPOONER.
By His Attorney July 12, 1932.  H. W. SPOONER  1,866,944
METHOD AND APPARATUS FOR PRINTING SECURITY QUOTATIONS
Filed Nov. 23, 1926  3 Sheets-Sheet 2
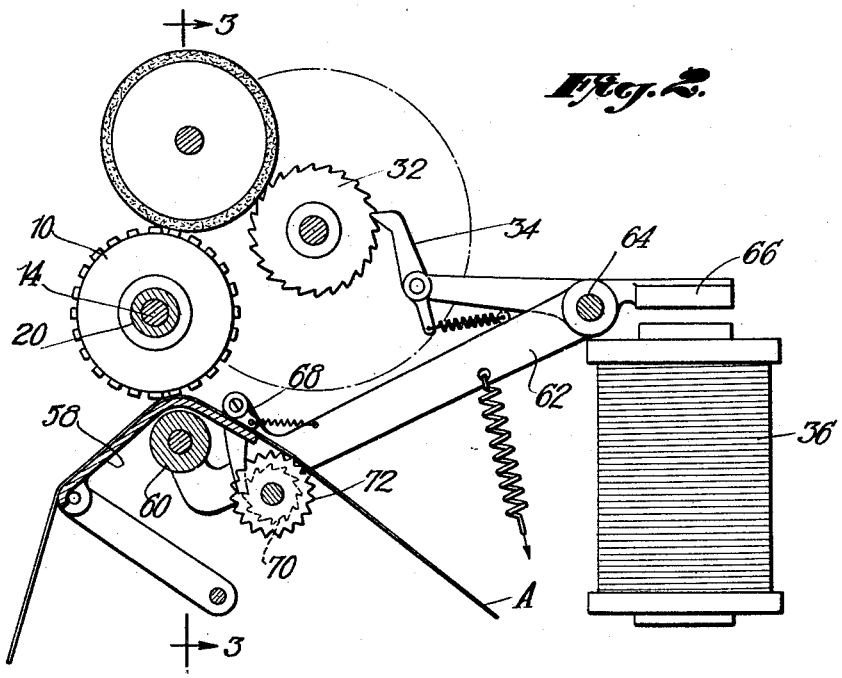
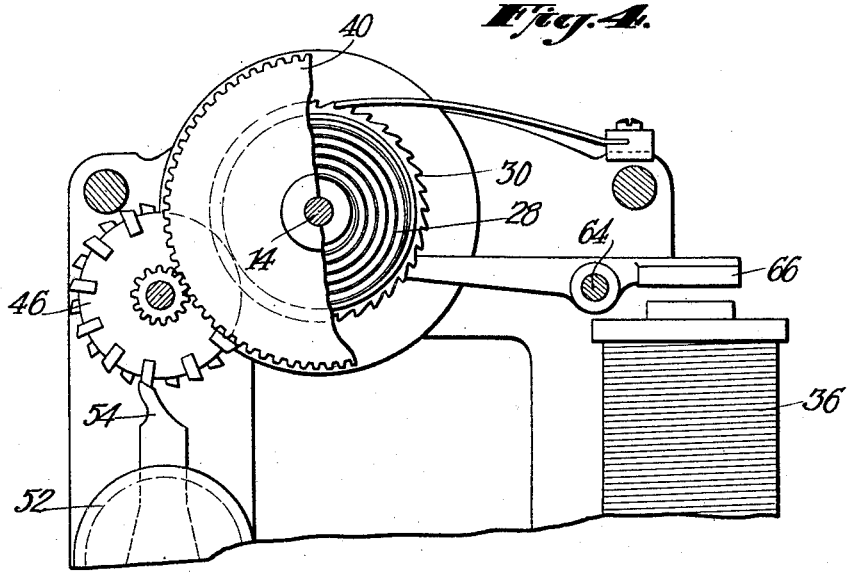
Inventor
HENRY W. SPOONER.
By His Attorney

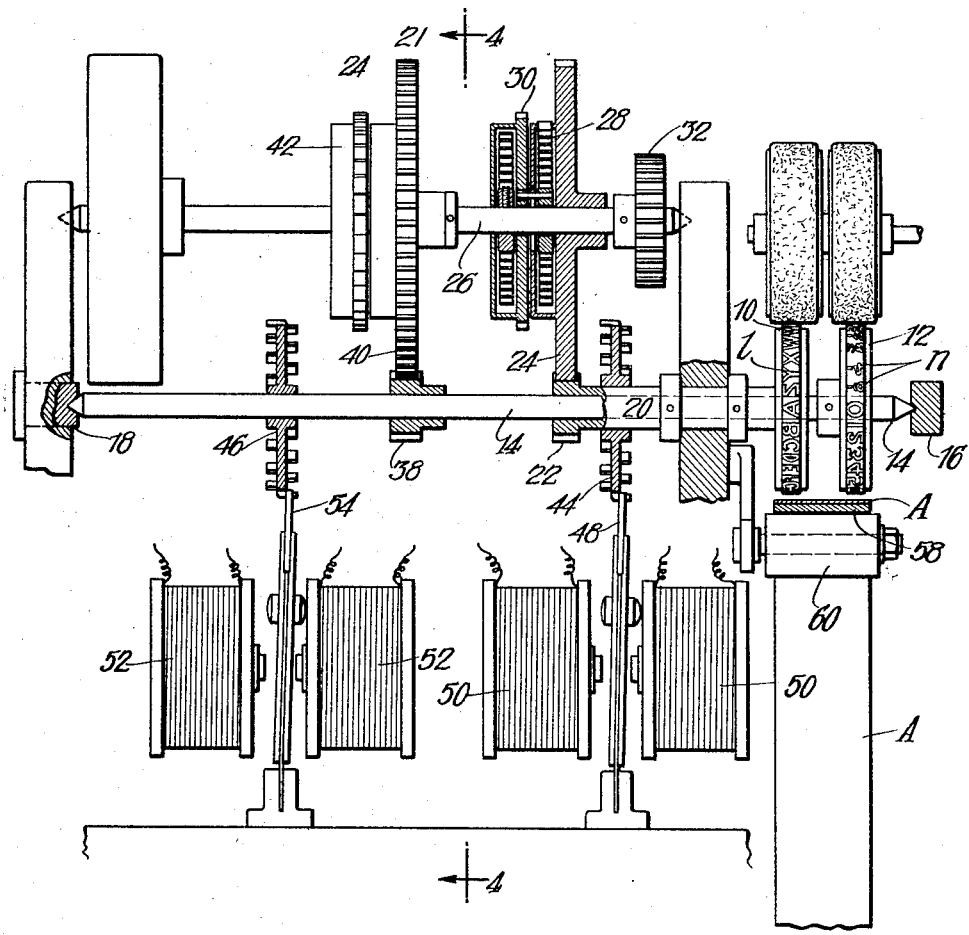

Patented July 12, 1932

1,866,944

UNITED STATES PATENT OFFICE

HENRY W. SPOONER, OF BROOKLYN, NEW YORK

METHOD AND APPARATUS FOR PRINTING SECURITY QUOTATIONS

Application filed November 23, 1926. Serial No. 150,228.

This invention relates to improvements in the method of and apparatus for printing quotations of listed securities such as stocks and bonds dealt in on various stock exchanges. The invention has particular reference to the printing of stock quotations by that type of printing telegraph instrument generally known as a stock ticker. The invention also embraces certain improvements in the ticker tape itself as will be apparent as the description proceeds. An important aim of the invention is to improve the service rendered by the type of printing telegraph instrument known as the stock ticker by the provision of an improved method and apparatus whereby identifying abbreviations and price marks are recorded simultaneously so as to increase the rate of speed at which the instrument can operate.

It is a recognized fact that the maximum operating speed of the telegraph ticker service in use by the New York Stock Exchange is inadequate, and that during periods of extremely heavy transaction on the exchange due to active market fluctuation or manipulation of various securities, the telegraph ticker now in use falls far behind in its work. Instances have been noted in which the printed quotations did not appear on the ticker tape for over half an hour after the corresponding sales were made on the floor of the exchange. Even slight delays are frequently serious to brokers and to customers, for during heavy transactions the price of a stock may rise or fall considerably in a very short time. It is apparent, therefore, that if the quotations recorded by the ticker are delayed, there may be a considerable variation between a given quotation and the actual market price of the same stock on the exchange floor at the time the quotation is printed.

Under the present method of printing quotations the abbreviation representing the name of the stock or other security is printed along the top edge of the tape, and is followed by the price quotation, which is printed along the bottom edge. The abbreviation and the figures are recorded by an integral type wheel, and as the mechanism of the instrument and of the sending apparatus is such that only one letter or figure may be printed at a time, it is necessary that the figures representing the quotation be printed after the letters representing the corresponding stock.

My improved method and apparatus overcomes the objections above noted and provides for the simultaneous printing of identifying indicia and price indicia. For example, I preferably simultaneously print the first letter of an abbreviation identifying a given security and the first figure of the corresponding price quotation. I then print the second letter of the abbreviation and simultaneously the second figure of the price quotation and so on. Thus, if a given stock or bond is represented by a three letter abbreviation and the price is indicated by three figures, it can be printed according to my invention in one half of the space required by that of the ticker telegraphs heretofore used. Also in the example just given according to my invention the abbreviation and price quotation will be recorded on a length of ticker tape one-half as long as that required by the method heretofore in general use. In the old type of machine to print a three letter abbreviation and a three figure price, six strokes of the printing mechanism are required, three for the abbreviation and three for the price. By my method only three strokes are required to print the same amount of data. Thus in the example given, my apparatus prints twice as fast. Of course, all securities are not abbreviated by three letters and all prices are not naturally represented by three figures, and therefore, where the number of price figures exceeds the number of identifying letters in the abbreviation, the saving is not quite so great. But it is sufficient to greatly increase the efficiency of the service.

The invention will be fully understood from the following specification when read in connection with the accompanying drawings and the points of novelty will be defined with particularity in the appended claims. In the drawings—

Fig. 1 illustrates two lengths of ticker tape drawn to the same scale and recording the same transactions. The upper strip represents a series of stock quotations printed according to my invention. The lower strip shows the length of tape required for printing the same quotations by the method and apparatus heretofore in general use;

Fig. 2 is a diagrammatic view partly in side elevation and partly in section illustrating a suitable arrangement of apparatus for carrying out my invention;

Fig. 3 is a sectional view on line 3—3 of Fig. 2 certain parts in the rear being broken away in the interest of clearness;

Fig. 4 is a detail sectional view on line 4—4 of Fig. 3;

Fig. 5 illustrates a modification.

Referring first to Fig. 1, the upper piece of ticker tape A embodies features of my invention and is printed in accordance with my improved method and by means of my improved telegraph printer. The strip of tape B it is noted is of greater length than the strip A. The strip B shows graphically that the same data contained in strip A requires a longer piece of tape.

In the piece of tape A it is noted that the various abbreviations C are printed in a line along the top of the tape and that the corresponding price or quotation marks P are located directly under the abbreviations. In other words, the identifying indicia C is in transverse alignment with the price or quotation indicia P. In contra-distinction it is noted that in the strip of tape B the abbreviations C' are offset with respect to the price marks P or quotation P'.

In the printing telegraph or stock ticker apparatus of the prior art, the identifying indicia or security abbreviations are printed by step by step motion of a type wheel. Following the step by step printing of the abbreviation, a number wheel movable with the type wheel which prints the abbreviations, also makes the step by step motion to bring the different price figures into printing position. For example, in the machines heretofore in general use to print a stock quotation identified by a three letter abbreviation, sold at a price of $100 or more would require a maximum of six printing strokes, three strokes to print the abbreviation and three strokes to print the three figures representing the price (if in even dollars). According to my invention to print this same quotation will require only three strokes because my improved telegraph instrument moves the abbreviation or letter type wheel simultaneously with the movement of the numeral or price type wheel as will appear from the following detail description which describes by way of example a suitable machine embodying features of improvement over the prior art for printing stock or other security quotations in accordance with my improved method.

Referring first to Figs. 2 and 3, 10 and 12 represent independently movable type wheels, the wheel 10 having letter type faces l thereon adapted to print abbreviations and the type wheel 12 having numeral type faces n thereon adapted to print price marks or quotations. For convenience of description, wheel 10 will be called the letter wheel and wheel 12 will be called the number wheel. The number wheel is fast to a shaft 14 mounted in suitable bearings 16 and 18. The letter wheel 10 is fast to and moves with a sleeve 20 loosely mounted on the shaft 14 so that the number wheel and letter wheel can be moved independently of one another.

Secured to the sleeve 20 is a gear 22 which meshes with a gear 24 loosely mounted on the shaft 26. Shaft 14 is driven through the gear 24 by certain intermediate spring motor mechanism of known construction indicated at 28. A ratchet and pawl arrangement indicated at 30 is provided for the purpose of permitting the storage of energy in the spring motor mechanism. The shaft 26 is intermittently turned by means of ratchet and pawl mechanism 32, 34, the pawl being given one impulse every time the printing magnet 36 is energized.

The number wheel shaft 14 also has secured thereto a gear 38 which meshes with a gear 40 similar to the gear 24 above referred to, said gear 40 also being loose on shaft 26 and driven through spring motor mechanism 42 of known construction. It is to be noted that the gears 24 and 40 while they both receive their driving energy from the shaft 26, are capable of independent relative movement.

The letter wheel sleeve 20 carries a ratchet 44 and the number wheel shaft 14 carries a similar ratchet 46. The teeth of the ratchet 44 co-operate with a pawl 48 mounted for pivotal movement so that teeth on alternate sides of the ratchet come into play one after the other. The step by step movements of the ratchet 44 are accomplished by oscillating pawl 48 produced by alternate magnetization of the two polarized magnets 50 and the arrangement is such that at every reversal of polarity of the current the pawl 48 swings over to permit the ratchet 44 to advance one tooth. This, of course, moves the letter wheel a corresponding distance. By causing a suitable number of electrical impulses to be transmitted through the magnets 50, it is apparent that any desired or selected letter on the type wheel can be brought to printing position.

Similarly, a pair of magnets 52 control the movement of a pawl 54 so that any selected number on the number wheel 12 can be brought to printing position. It is thus apparent that the arrangement is such that the letter wheel and the number wheel can be simultaneously turned to printing position.

Assuming that a letter and figure have been brought to printing position on the letter and type wheel, respectively, it is clear that if the two wheels are in axial alignment and are of the same diameter that both a letter and a figure can be simultaneously printed.

In the machine illustrated, the quotations are recorded on a narrow piece of tape A fed from a supply reel not shown. The tape is guided over a movably mounted platen 58 below which is mounted a hammer roller 60 carried by a hammer lever 62 fixed on the shaft 64 which is adapted to be periodically rocked when the armature 66 is pulled down by the energization of the printing magnet 36.

It is noted that the hammer roller 60 (Fig. 3) is of such length that it extends under both the type wheel and number wheel. Therefore, when the printing magnet 36 is energized, the hammer will cause an impression from both wheels to be simultaneously made on the tape A. On the down stroke of the hammer lever 62, a pawl 68 carried thereby advances a ratchet 70 a distance of one tooth. This turns the roller 72 and advances the ticker tape A one step forward so as to present a blank portion of tape opposite the printing faces on the letter and number wheels ready for the next impression.

Fig. 5 shows a further alternative arrangement of independently mounting the number and letter wheels of the same size, the letter wheel l' being on a shaft 20' which extends in one direction and the number wheel n' on a shaft 14' which extends in the opposite direction.

Each magnet 50 and 52 above referred to is controlled by an individual ticker telegraph transmitter of known type. Such transmitters are controlled by a so-called code tape which is perforated in accordance with a predetermined code. The operation and construction of such perforated tape-controlled telegraph transmitter is well known in the art. With the usual ticker only a single transmitter is required to control movement of the type wheel. But, with my improved machine, two transmitters are required, that is, one for the magnet 50 and another for the magnet 52. Each transmitter is controlled by an individual code tape, therefore, by feeding the respective code tapes to the transmitters in synchronism, it is apparent that said transmitters will control the simultaneous selective operations of the magnets 50 and 52.

The simultaneous printing of letters and figures it is apparent is accomplished by my improved machine by the use of two separate type carriers mounted adjacent to each other so that an impression can be made from the type of both carriers at one stroke of the printing mechanism. This effects an appreciable saving in time over that required in printing by stock tickers heretofore in general use which require one set of impressions or movements of the printing mechanism to print the abbreviations and another set of impressions or printing strokes to effect the price recording. The importance of printing at greater speed will be apparent to those interested in trading in stocks and bonds on the various exchanges. The greater speed of printing will reduce to a large extent the present discrepancy between the floor trading price and the printed price at a given time. The increase of speed will also be of benefit to subscribers to ticker service after the closing of the stock exchange, when the "bid and asked" prices are printed followed by the "high and low" prices for the day and the stock clearing corporation delivery prices. The printing of these quotations by my improved method and apparatus effects a great saving of time over that formerly required for the reason that the average number of letters in the abbreviations correspond more closely with the number of figures required for the corresponding price quotations.

Thus the printing of statistics following the closing of the exchange can be accomplished by my method and apparatus in much less time than is required by the method and apparatus heretofore in general use. This results in expediting the work in brokerage offices and newspaper plants where it is known that the summation or general review of the day's transactions must be quickly and accurately recorded. While I have referred to stock quotations, it is apparent that the invention is equally applicable to the recording of various kinds of transactions and the term security used in the claims is intended to refer to stocks, bonds and various other commodities traded in.

While I have described my invention with great particularity and have illustrated features therein by reference to specific examples of certain mechanism, it is not to be construed that I am limited thereto since various modifications and substitution of equivalents may be made by those skilled in the art without departing from the invention as defined in the appended claims.

What I claim is:—

1. A method of printing on ticker tape which comprises the printing of abbreviations of listed securities in one line, and at substantially the same time printing corresponding price quotations in another parallel line, each price quotation being printed substantially or approximately in transverse alignment with a corresponding abbreviation.

2. A method of printing on ticker tape comprising impressing a record line of identifying indicia and a line of price indicia substantially parallel thereto, the indicia in one line being approximately in transverse alignment with that in the other line.

3. A method of printing on ticker tape which comprises simultaneously printing an upper line of abbreviations of various securities and a line of corresponding price quotations directly below the abbreviations.

4. In the telegraph-printing of security quotations the method which consists in simultaneously recording both identification indicia and price indicia.

5. In the telegraph-printing of security quotations the method which consists in simultaneously printing the first letter of an abbreviation and the first figure of the corresponding price quotation, the second letter of said abbreviation and second figure of said quotation, and so on.

6. A printing telegraph having two juxtaposed separate and independently driven type wheels and separate means adapted to turn each wheel at substantially the same time to position to print a desired character.

7. A printing telegraph having two juxtaposed separate and independently movable type wheels having characters thereon and separate means for stopping each wheel in position to print a desired character and means for simultaneously printing selected characters said type wheels being adapted to both move independently at the same time.

8. A printing telegraph having a letter type wheel and a numeral type wheel rotatable independently about the same axis and means for simultaneously recording a selected letter and a selected figure carried by said type wheels.

9. A printing telegraph adapted to simultaneously print abbreviation and price indicia, including in combination a letter type carrier, a number type carrier, means for independently moving both type carriers at substantially the same time through different distances, and separate means adapted to stop the carriers so as to position a selected letter type and number type.

10. A printing telegraph having a letter type wheel and a numeral type wheel axially aligned but rotatable independently, separate driving means for turning each wheel and separate means adapted to stop each wheel so as to position a selected letter and a selected number in printing position at substantially the same time.

11. A printing telegraph having juxtaposed separate and independently driven numeral and letter type carriers, separate means for independently stopping each type carrier in printing position and means for simultaneously recording the numeral and letter brought to printing position.

12. A printing telegraph for recording stock quotations including a numeral type wheel and a letter type wheel, one being mounted on an inner shaft and the other being mounted on a sleeve carried by said shaft and separate means adapted to drive said shaft and said sleeve independently and means whereby a selected numeral and a selected letter can be stopped in printing position at substantially the same time.

In witness whereof, I have hereunto signed my name.

HENRY W. SPOONER.